United States Patent
Slater et al.

(10) Patent No.: US 10,382,524 B2
(45) Date of Patent: Aug. 13, 2019

(54) PROCESSING DATA RECEIVED VIA A NETWORK FROM MULTIPLE CLIENT DEVICES

(71) Applicant: Accenture Global Services Limited, Dublin (IE)

(72) Inventors: Benjamin Anthony Slater, Lyneham (AU); Christopher P. Checco, Oakton, VA (US)

(73) Assignee: Accenture Global Services Limited, Dublin (IE)

(*) Notice: Subject to any disclaimer, the term of this patent is extended or adjusted under 35 U.S.C. 154(b) by 608 days.

(21) Appl. No.: 14/792,435

(22) Filed: Jul. 6, 2015

(65) Prior Publication Data
US 2015/0312320 A1 Oct. 29, 2015

Related U.S. Application Data

(63) Continuation of application No. 12/845,933, filed on Jul. 29, 2010, now abandoned.

(51) Int. Cl.
| | |
|---|---|
| *G06Q 40/00* | (2012.01) |
| *G06Q 40/02* | (2012.01) |
| *G06Q 40/08* | (2012.01) |
| *H04L 29/08* | (2006.01) |
| *H04L 29/06* | (2006.01) |

(52) U.S. Cl.
CPC ............ *H04L 67/06* (2013.01); *G06Q 40/00* (2013.01); *G06Q 40/025* (2013.01); *G06Q 40/08* (2013.01); *G06Q 40/123* (2013.12); *H04L 67/42* (2013.01)

(58) Field of Classification Search
CPC ........ G06Q 40/00; G06Q 40/02; G06Q 40/08; G06Q 40/025
USPC ......................................................... 705/35
See application file for complete search history.

(56) References Cited

U.S. PATENT DOCUMENTS

| | | | |
|---|---|---|---|
| 6,912,508 B1 * | 6/2005 | McCalden | G06Q 10/10 705/16 |
| 7,680,719 B1 * | 3/2010 | Brady | G06Q 40/06 705/36 R |
| 8,386,395 B1 | 2/2013 | Gordon et al. | |
| 2001/0044734 A1 | 11/2001 | Walker et al. | |
| 2006/0095521 A1 | 5/2006 | Patinkin | |

(Continued)

OTHER PUBLICATIONS

Risk Based Scoring System Version 2.0 (RBSS v 2.0)—Privacy Impact Assessment, PIA Date—Feb. 19, 2009, 8 pages.

(Continued)

*Primary Examiner* — Hai Tran
(74) *Attorney, Agent, or Firm* — Harrity & Harrity, LLP (57) ABSTRACT

A system may comprise one or more processors. The one or more processors may store data, associated with a plurality of documents, as stored data and may receive documents from a plurality of client devices. The documents may include a plurality of different types of data. The one or more processors may assign the documents to one or more groups based on the plurality of different types of data and may identify a group of documents of the one or more groups. The one or more processors may compare data, within documents in the group of documents, to the stored data and may transmit, to one or more devices, a result of comparing the data to the stored data.

20 Claims, 4 Drawing Sheets

(56) References Cited

U.S. PATENT DOCUMENTS

| | | | |
|---|---|---|---|
| 2009/0234684 A1* | 9/2009 | Stoke | G06Q 10/0635 |
| | | | 705/7.36 |
| 2010/0332362 A1* | 12/2010 | Ramsey | G06Q 10/0635 |
| | | | 705/31 |
| 2011/0131122 A1* | 6/2011 | Griffin | G06Q 40/00 |
| | | | 705/35 |
| 2011/0131123 A1 | 6/2011 | Griffin et al. | |
| 2012/0030080 A1 | 2/2012 | Slater et al. | |

OTHER PUBLICATIONS

File Tax, "Will Your Tax Return be Audited?", http://www.filetax.com/audit.html, 2006, 3 pages.

\* cited by examiner

PROCESSING DATA RECEIVED VIA A NETWORK FROM MULTIPLE CLIENT DEVICES

RELATED APPLICATION

This application is a continuation of U.S. patent application Ser. No. 12/845,933, filed on Jul. 29, 2010, the disclosure of which is incorporated herein by reference.

TECHNICAL FIELD

The present disclosure generally relates to systems and methods for monitoring risk associated with fraud. More particularly, the present disclosure relates to systems and methods for receiving and processing tax return data and comparing current tax return data to other current tax return data to determine potential fraud.

BACKGROUND

Taxpayers, such as, for example, individuals and companies, may file income tax returns yearly. Consequently, based on a taxpayer's gross income and possible deductions and exemptions available, a taxpayer may either owe taxes or receive a refund for taxes paid during the year. Accordingly, it is common for a taxpayer to attempt to reduce his taxable income, and associated income tax liability, to either pay as little tax as possible or receive as large a tax refund as possible.

In order to reduce the amount of income tax liability, a taxpayer may, for example, deduct expenses that are not legally available, claim more dependents than allowed by law, fail to report all earned income, or perform other such illegal activities. These are examples of fraudulent actions that a taxpayer may take to reduce income tax liability. In addition, a taxpayer may purchase or steal one or more false identities and file fraudulent tax returns in an effort to receive a tax refund. These are other examples of fraudulent activity.

Such examples are prevalent and are increasingly common and difficult to catch by the tax receiving agency. For example, over 130 million tax returns were filed with the Internal Revenue Service ("IRS") in 2007. A corresponding number of tax returns were also filed in the corresponding state(s) of residence for each taxpayer. Therefore, the large volume of filed tax returns results in a large number of fraudulent tax returns.

One way to identify a fraudulent tax return would be to audit the return, e.g., by comparing it to previously filed returns, historical data, and other relevant information. When applying analytics to determine a fraud risk of a particular transaction (e.g. tax return processing), it is desirable to apply one or more risk rules to data contained in the transaction and/or to a broad range of stored historical data. Current systems typically conduct a manual analysis, normally after the peak return filing season is complete. However, the manual nature of the analysis may limit both the scope of the analysis that can be completed and the timeliness of the analysis. Current systems may also conduct an automated analysis, but this analysis is often undertaken on an individual transaction basis and is not used to monitor for new risk that can be discovered through a system-wide analysis.

In current systems, data analysis is a common method for discovering patterns of fraud and non-compliance. Specifically, trends and patterns in the data may be modeled, and changes and anomalies in the trends may be reviewed to determine if they are related to fraud. However, the analysis conducted in current systems may not detect new issues until a significant time has passed after fraudulent acts are committed. Therefore, during the time prior to detection, fraud can continue to occur, and the perpetrators of the fraud may avoid detection.

In current systems, there is a need to allow revenue (e.g. tax) agencies to monitor for changes in systemic risk. Accordingly, there is a need to create statistical summaries of one or more fields of data contained in one or more forms submitted to the revenue agencies, statistically determine patterns in the statistical summaries, and monitor for changes in the patterns. Furthermore, when a change or anomaly is detected, there is a need to provide an alert to conduct an investigation of the change or anomaly to determine if it is a result of fraud or abuse.

Accordingly, there is a need to automate the monitoring of risk analysis so that it may be executed repeatedly over the course of a filing season, thereby achieving a wider range of anomaly and pattern detection to be applied than could be applied manually. In particular, a system is needed that provides data structures which may summarize base data patterns on a predetermined (e.g. daily, weekly, monthly, yearly) basis to provide for an analysis and comparison of the patterns.

Therefore, a system is needed that enables new types of fraud to be detected more quickly, thereby sending an alert to review the data to determine possible fraud to block fraudulent filings. To address these needs, a system is needed that may automatically monitor patterns of risk of one or more tax returns.

SUMMARY

In one exemplary embodiment, there is provided a method for monitoring risk. The method may include receiving, grouping, and summarizing first information relating to first data. The method may also include storing, based on the receiving, grouping, and summarizing, the information in one or more tables, wherein each of the one or more tables is associated with one or more fields of data. The method may also include receiving, grouping, and summarizing second information relating to second data. The method may also include querying the one or more tables. The method may include comparing the information received in response to the querying of one or more tables with the second information. The method may further include providing an indication of risk based with the comparison, wherein the first information and the second information include tax return information.

In another exemplary embodiment, there is provided a computer-readable recording medium storing a computer-executable program which, when executed by a processor, performs a method for monitoring risk. The method may include receiving, grouping, and summarizing first information relating to first data. The method may also include storing, based on the receiving, grouping, and summarizing, the information in one or more tables, wherein each of the one or more tables is associated with one or more fields of data. The method may also include receiving, grouping, and summarizing second information relating to second data. The method may also include querying the one or more tables. The method may also include comparing the information received in response to the querying of one or more tables with the second information. The method may further include providing an indication of risk based with the comparison, wherein the first information and the second information include tax return information.

In another exemplary embodiment, there is provided a computer system for determining risk, including a computer having memory and a processor. The computer system may include one or more systems that include data and a risk monitoring center in communication with the one or more systems. The risk monitoring center may receive, group, and summarize first information relating to first data. The risk monitoring center may store, based on the receiving, grouping, and summarizing, the information in one or more tables, wherein each of the one or more tables is associated with one or more fields of data. The risk monitoring center may receive, group, and summarize second information relating to second data. The risk monitoring center may query the one or more tables. The risk monitoring center may compare the information received in response to the querying of one or more tables with the second information. The risk monitoring center may also provide an indication of risk based with the comparison, wherein the first information and the second information include tax return information.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure. Instead, the proper scope of the disclosure is defined by the appended claims.

Figure 1:
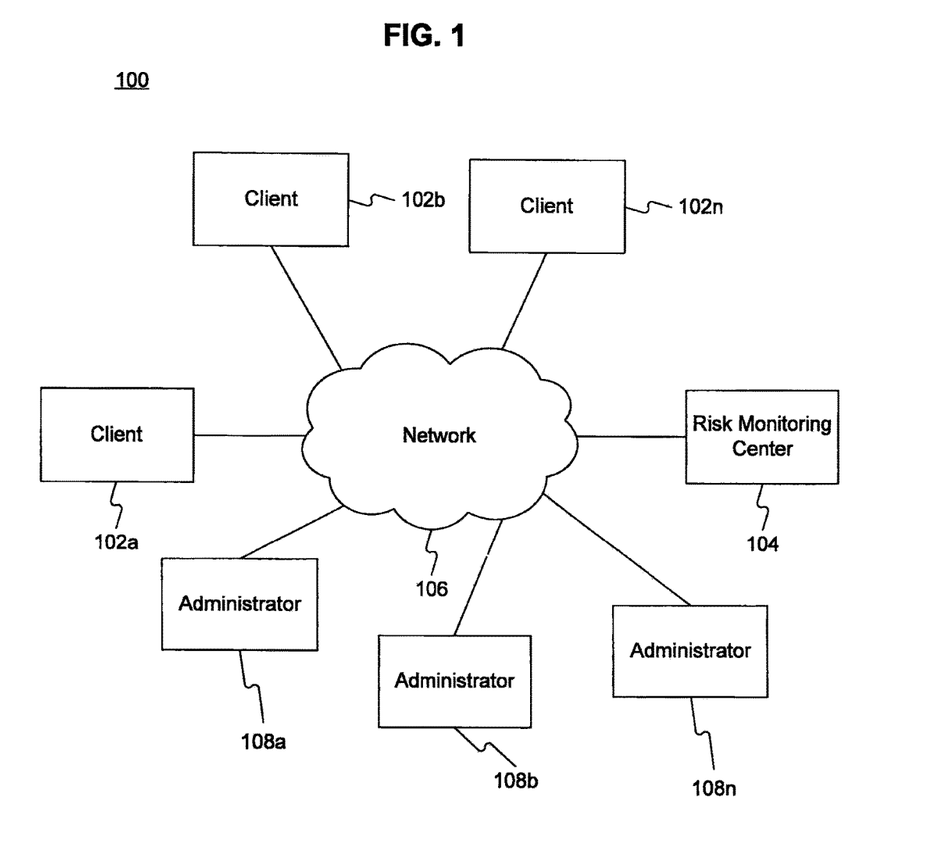
FIG. 1 illustrates an exemplary computing system that can be used to implement embodiments of the disclosure.

By way of a non limiting example, FIG. 1 illustrates a system 100 in which the features and principles of the present disclosure may be implemented. The number of components in system 100 is not limited to what is shown, and other variations in the number of arrangements of components are possible, consistent with embodiments of the disclosure. The components of FIG. 1 may be implemented through hardware, software, firmware, etc. System 100 may include clients 102a, 102b, through 102n, risk monitoring center 104, network 106, and administrators 108a, 108b, through 108n.

As illustrated in FIG. 1, clients 102a-102n may store tax return data and may communicate the data to risk monitoring center 104 via network 106. Risk monitoring center 104 may receive the data from clients 102a-102n, process the received data, generate one or more alerts regarding potential fraud associated with the received data, and send the processed data and one or more alerts to administrators 108a-108n. Administrators 108a-108n may review the one or more alerts regarding the potential risk of fraud in the tax return, conduct a more detailed analysis of the identified risk, determine if the taxpayer is attempting to fraudulently file the tax return, and perform other tasks related to reviewing the tax returns.

Network 106 provides communications between or among the various entities depicted in system 100. Network 106 may be a shared, public, or private network and may encompass a wide area network (WAN) or local area network (LAN). Network 106 may be implemented through any suitable combination of wired and/or wireless communication networks (including Wi-Fi networks, GSM/GPRS networks, TDMA networks, CDMA networks, Bluetooth networks, or any other wireless networks). By way of example, network 106 may be implemented through a wide area network (WAN), local area network (LAN), an intranet, and/or the Internet. Further, the entities of system 100 may be connected to multiple networks 106, such as, for example, to a wireless carrier network, a private data network, and the public Internet.

Clients 102a-102n may include one or more processors, such as, for example, computing devices. In an embodiment, clients 102a-102n may each include one or more databases that store data. The data may include, for example, tax return data for the current tax year. The tax return data may include, for example, a taxpayer's name, address, social security number, tax ID number, taxable income, number of exemptions, deductions, tax credits, etc. In addition to storing data regarding a taxpayer's tax return, one of ordinary skill would appreciate that clients 102a-102n may also store data regarding a joint tax return, tax returns for a company, and other such data.

Risk monitoring center 104 may provide a platform for receiving data from clients 102a-102n and communicating with administrators 108a-108n. Risk monitoring center 104 may be implemented using a combination of hardware, software, firmware, etc., and may be operable to receive and store data from various clients 102a-102n. For example, in an embodiment, risk monitoring center 104 may receive data from clients 102a-102n regarding tax information.

Risk monitoring center 104 may include one or more processors, such as, for example, computing devices. In an embodiment, risk monitoring center 104 may contain one or more databases that store one or more tables of data. The data may include, for example, a taxpayer's name, address, social security number, tax ID number, taxable income, number of exemptions, deductions, tax credits, and other such data.

Risk monitoring center 104 may also be operable to respond to requests for data. For example, administrator 108a may be a user that enters a request for data stored at risk monitoring center 104. The request may include one or more triggering parameters, which can be used to find the requested data. When risk monitoring center 104 receives a request for data from administrators 108a-108n, risk monitoring center 104 may search a database for risk monitoring center 104 and return the requested data, if found.

Risk monitoring center 104 may also generate one or more alerts regarding possible fraud. For example, a taxpayer may attempt to fraudulently claim more dependents, lower taxable income, or more itemized deductions than appropriate. If the taxpayer's current tax return claims more dependents than previous tax returns, risk monitoring center 104 may analyze the difference and determine if there is a risk of fraud associated with this difference. In an embodiment, risk monitoring center 104 may generate one or more alerts based on the data received from clients 102a-102n.

Furthermore, risk monitoring center 104 may employ a fast, scalable service to provide the requested data to administrators 108a-108n. The risk monitoring center 104 may include a multi-data center fault tolerance service that may be available for query, even during large loads within system 100. In addition, or in an alternative embodiment, this service may be called by an application running on administrators 108a-108n instead of being integrated with a relational database.

Clients 102a-102n may provide users with an interface to network 106. By way of example, clients 102a-102n may be implemented using any device capable of accessing a data network, such as a general purpose computer or personal computer equipped with a modem or other network interface. Clients 102a-102n may also be implemented in other devices, such as a Blackberry™, Ergo Audrey™, mobile phones (with data access functions), Personal Digital Assistant ("PDA") with a network connection, IP telephony phone, or generally any device capable of communicating over a data network.

Users may use clients 102a-102n to transmit data to risk monitoring center 104. In order to transmit data, the user may enter information on client 102a indicative of, for example, tax return data. After the user enters this information, client 102a may transmit the data to risk monitoring center 104, which in turn may receive, store, and analyze the data in its database.

Figure 2:
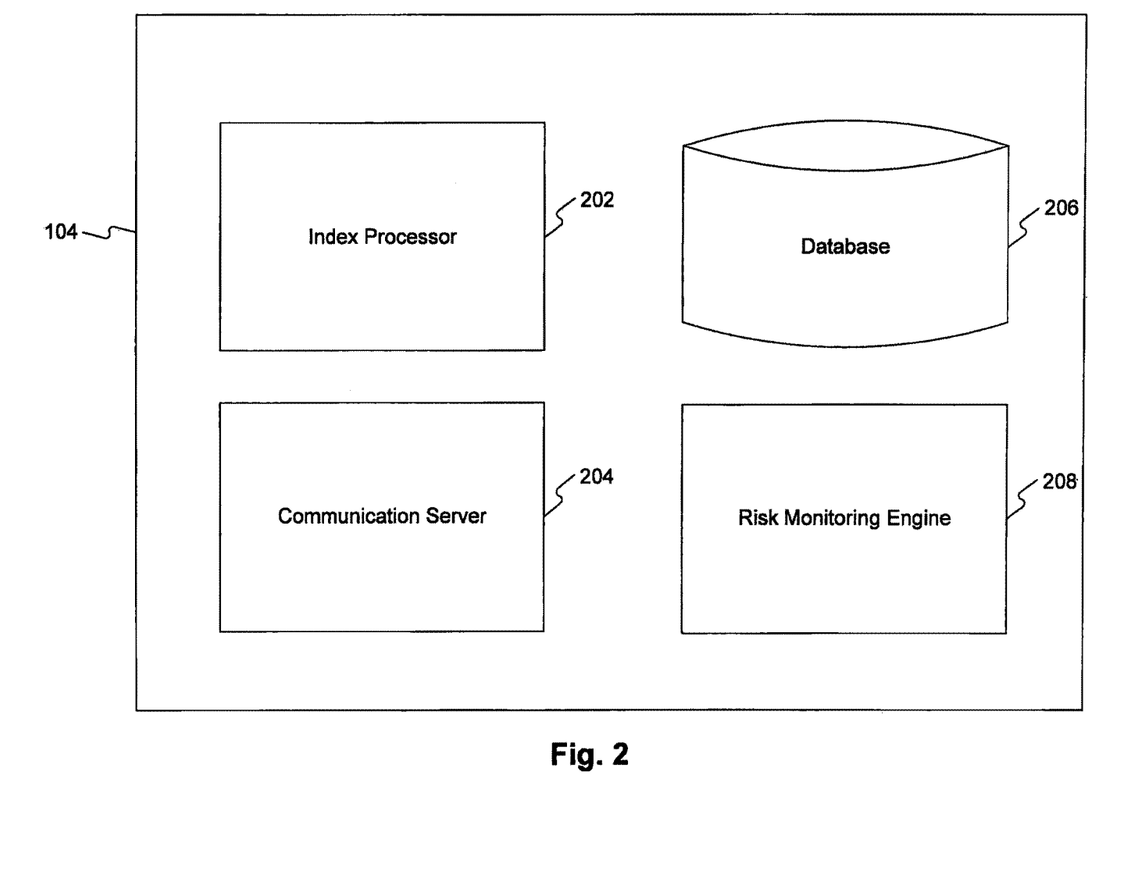
FIG. 2 illustrates an exemplary risking monitoring component that can be used to implement embodiments of the disclosure.

FIG. 2 is a diagram of an exemplary risk monitoring center 104 consistent with the present disclosure. For example, a tax authority may implement risk monitoring center 104 to monitor for potential fraud associated with a tax return. Risk monitoring center 104 may include at least an index processor 202, communication server 204, database 206, and risk monitoring engine 208.

Index processor 202 may be one or more known processing devices, such as, for example, a microprocessor from the Pentium family manufactured by Intel™ or a mainframe-class processor. In an embodiment, index processor 202 may receive data from clients 102a-102n, process the received data, and may send the processed data to administrators 108a-108n, etc.

Communication server 204 may be a web server that provides functionality for receiving traffic over a network, such as the Internet. For example, communication server 204 may be a web server that a user may access at client 102a or administrator 108a using a web browser program, such as Safari, Internet Explorer, or Netscape Communicator. Communication server 204 is operable to receive data and requests for data, pass the requested to the appropriate party, etc.

Database 206 may receive and store data regarding tax returns. For example, numerous taxpayers file tax return during a current tax season. The data contained in the tax returns may be parsed into different fields such as, for example, street name, city, state, postal code, occupation, gross income, and other such data. This information may be summarized and stored in one or more tables within database 206. This information may also be updated as additional tax returns are filed during the tax season. For example, database 206 may be updated daily, weekly, monthly, yearly, or any other amount of time. By way of example, database 206 may be an Oracle™ database, a Sybase™ database, or other relational database.

As additional tax returns are filed, the data contained in the additional tax returns may be analyzed by risk monitoring center 104. In addition, database 206 may be updated with the new data. In addition to updating database 206, the received data may also be compared against stored tables of data to determine potential fraud. Thousands of tax returns may be filed each day during the tax season. As the tax returns are filed, risk monitoring center 104 may receive the data and analyze the data to determine potential fraud by comparing the data contained in the current group of tax returns with the data contained in the tables of database 206.

Risk monitoring engine 208 may query database 206 to receive the data, associated with the filed tax returns, contained in the one or more tables. For example, when current tax return is filed by client 102a, risk monitoring engine 208 may group the current tax return with other filed tax returns based on, for example, a postal code, time of receipt, and other relevant information. Risk monitoring engine 208 may also query database 206 to receive the data contained in the one or more tables related to the group. This information may be useful to determine if a changed pattern exists in the group that may be indicative of potential fraud.

A plurality of grouping techniques may exist, and different groups may have different risk scores depending on the identified risk. Each risk score may be compared with a risk score threshold that may be predetermined or customized. For example, each tax season different risk score thresholds may be determined. Conversely, risk score thresholds may be used, unchanged, between tax seasons.

One example of risk score threshold may correspond to an average refund amount for a specific postal code during a current tax year. In a specific postal code, the average refund may be $5,000, with a standard deviation of $300. However, if an average refund for the postal code for a current day, week, or month is $10,000, this difference in refund amount may be considered an indicator of a high fraud of risk.

Depending on the risk score determined by risk monitoring engine 208, risk monitoring engine 208 may determine if the score exceeds the threshold score. If the score exceeds the threshold score, risk monitoring engine 208 may flag the group of tax returns and send one or more alerts, e.g., to one or more administrators 108a-108n. Administrators 108a-108n may review the one or more alerts regarding the potential risk of fraud in the group of tax returns, conduct a more detailed analysis of the identified risk, and determine if the changed pattern identified in the group may indicate that fraud is occurring. Risk scores may relate to potentially risky characteristics, such as, for example, tax returns with a high number of deductions, a high number of exemptions, a high number of credits, or a reduced amount of taxable income.

Figure 3:
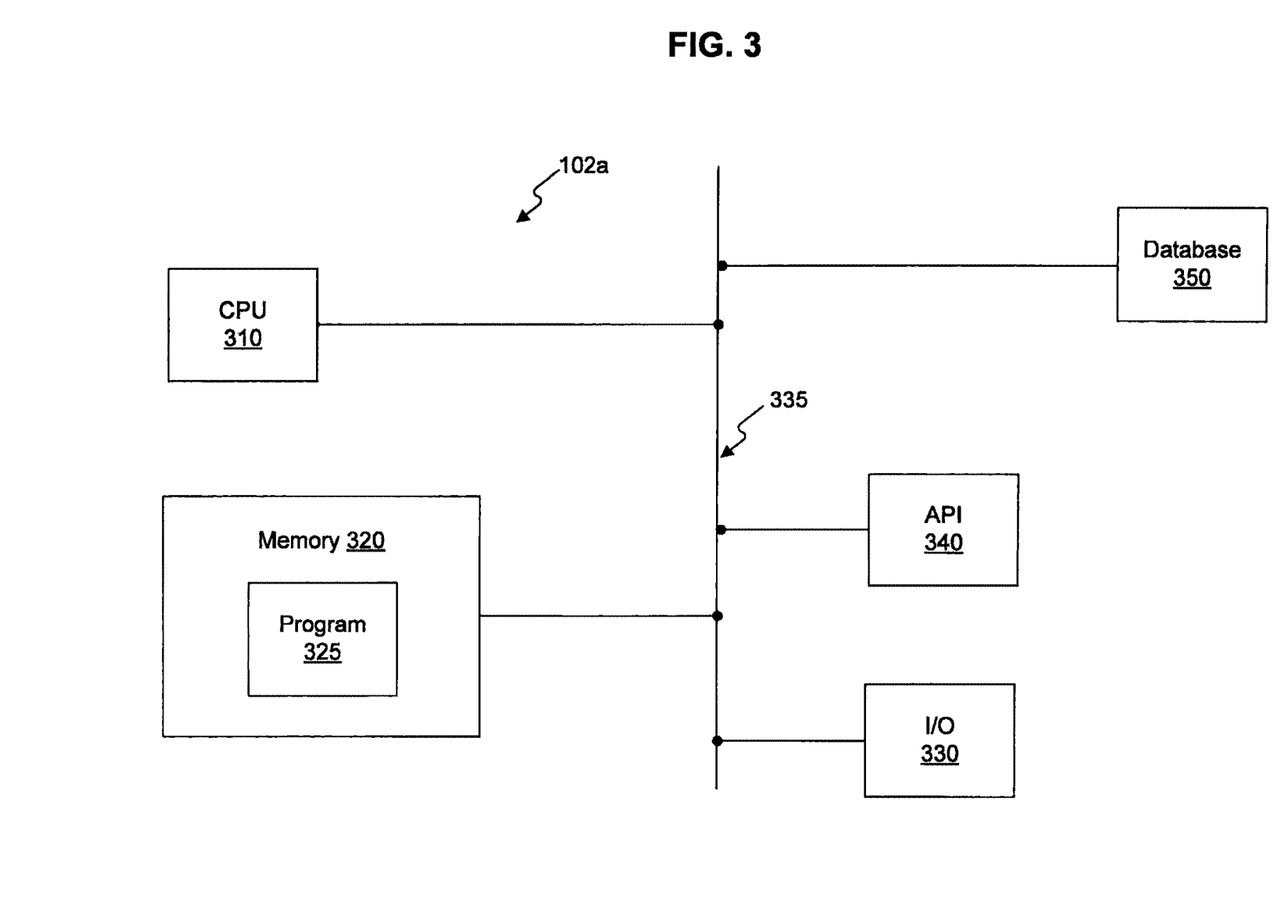
FIG. 3 illustrates an exemplary computing device that can be used to implement embodiments of the disclosure.

FIG. 3 illustrates an exemplary computing device 102a that can be used to implement embodiments of the disclosure. The components and arrangement, however, are not critical to the disclosure. One of ordinary skill will recognize that embodiments of the disclosure may be implemented by computers or workstations organized as shown, organized in a distributed processing system architecture, or organized in myriad suitable combinations of software, hardware, and/or firmware.

For example, client 102a may include components such as a central processing unit (CPU) 310, a memory 320, an input/output (I/O) device(s) 330, an application programming interface (API) 340, and a database 350 that can be implemented in various ways. For example, an integrated platform (such as a workstation, personal computer, laptop, etc.) may comprise CPU 310, memory 320, I/O devices 330, API 340, and database 350, interconnected by a local bus 335. In such a configuration, components 310, 320, 330, 340, and 350 may connect through a local bus interface.

CPU 310 may be one or more known processing devices, such as a microprocessor from the Pentium family manufactured by Intel™ or a mainframe-class processor. Memory 320 may be one or more storage devices configured to store information used by CPU 310 to perform certain functions, operations, and steps related to embodiments of the present disclosure. Memory 320 may be a magnetic, semiconductor, tape, optical, or other type of storage device. In one embodiment, memory 320 includes one or more software application programs 325 that, when executed by CPU 310, perform various processes consistent with the present disclosure.

Methods, systems, and articles of manufacture consistent with the present disclosure are not limited to programs configured to perform dedicated tasks. For example, memory 320 may be configured with a program 325 that performs several functions consistent with the disclosure when executed by CPU 310. Alternatively, CPU 310 may execute one or more programs located remotely from client 102a. For example, client 102a may access one or more remote programs that, when executed, perform functions related to embodiments of the present disclosure. The configuration and number of programs implementing processes consistent with the disclosure are not critical to the disclosure.

Memory 320 may be also be configured with an operating system (not shown) that performs several functions well known in the art when executed by CPU 310. By way of example, the operating system may be Microsoft Windows™, Unix™, Linux™, an Apple™ operating system such as MAC OSX™, Personal Digital Assistant operating system such as Microsoft CE™, or any other operating system. The choice of operating system, and even the use of an operating system, is not critical to the disclosure.

I/O device(s) 330 may comprise one or more input/output devices that allow data to be received and/or transmitted by client 102a. For example, I/O device 330 may include one or more input devices, such as a network connection, keyboard, touch screen, mouse, microphone, disk reader, and the like, that enable data to be input or received from a user. Further, I/O device 330 may include one or more output devices, such as a network connection, display screen, printer, speaker devices, and the like, that enable data to be output or presented to a user. The configuration and number of input and/or output devices incorporated in I/O device 330 are not critical to the disclosure.

API 340 is an interface used by client 102a to execute user requests. In an embodiment, API 340 may be used in conjunction with I/O device 330 to define, for example, monitoring parameters, events, and notifications with respect to tax returns. In addition, API 340 may query and receive information regarding tax returns in response to information received at I/O device 330. API 340 may also update information stored in databases 206 and 210.

Database 350 may comprise one or more databases that store information and are accessed and managed through system 100. By way of example, database 350 maybe an Oracle™ database, a Sybase™ database, or any other relational database.

Figure 4:
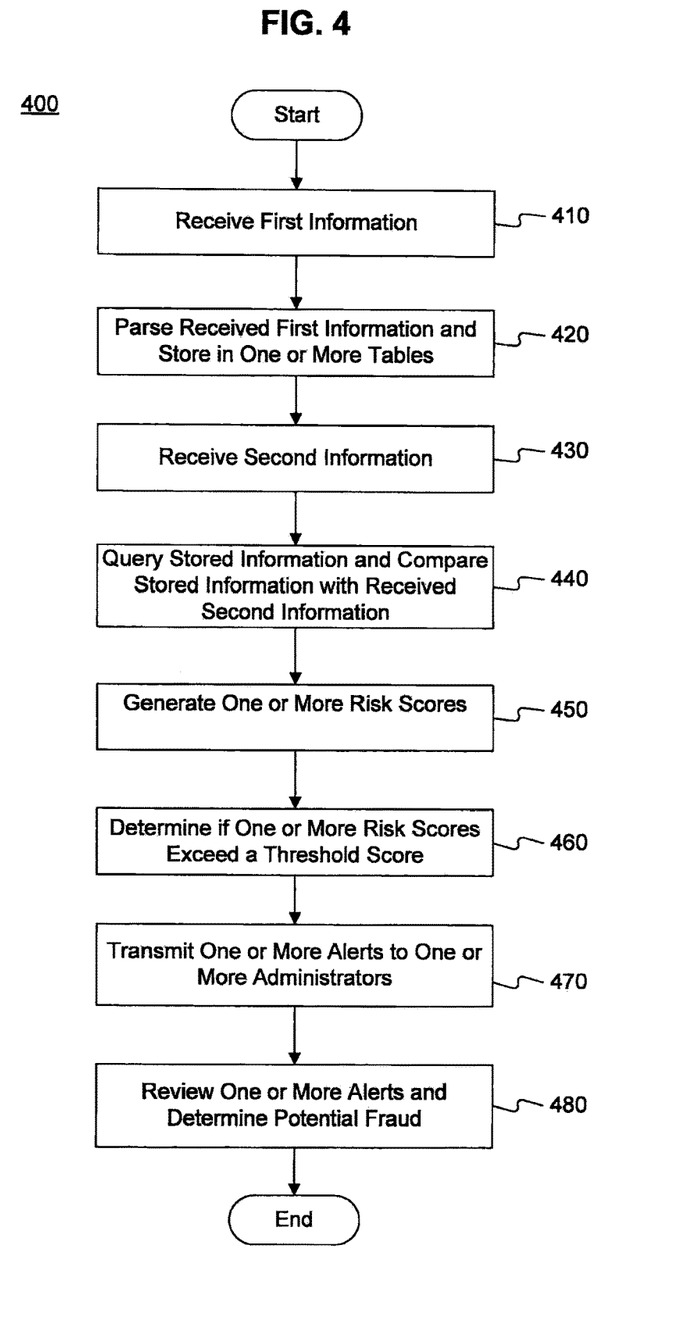
FIG. 4 illustrates a flowchart of an exemplary method for monitoring risk consistent with an embodiment of the present disclosure.

FIG. 4 illustrates a flowchart 400 of an exemplary method for processing tax information associated with filed tax returns in a risk monitoring center, consistent with principles of the present disclosure. Although the steps of the flowchart are described in a particular order, one skilled in the art will appreciate that in certain embodiments these steps may be performed in a modified or different order, or that certain steps may be omitted or other steps added. Further, one or more of the steps in FIG. 4 may be performed concurrently or in parallel.

It is common for individuals to obtain, through purchase or theft, names and social security numbers of other people and file tax returns for these false identities. For example, an individual may purchase or steal the identity of ten people and file a tax return that lists the same (or substantially the same) gross income for each person and the same (or substantially the same) tax refund amount on each tax return. If the tax refund amount is below a certain threshold, such as, for example, $1,000, conventional systems may not detect this fraud before the tax refund check or deposit issues due to the cost involved with examining individual returns. Accordingly, the individual that filed the fraudulent tax returns may receive the tax refund amounts. In order to prevent processing fraudulent tax returns, risk monitoring center 104 may monitor the tax returns according to the steps below.

Risk monitoring center 104 may receive information from clients 102a-102n (step 410). The information received by risk monitoring center 104 may relate to tax returns and may include, for example, a taxpayer's name, address, social security number, tax ID number, taxable income, number of exemptions, deductions, tax credits, and other such data. For example, numerous clients 102a-102n may file a tax return each day. Accordingly, risk monitoring system 104 may receive each filed tax return, and may analyze the information contained in the tax return.

Risk monitoring system 104 may parse the information into different fields such as, for example, street name, city, state, postal code, occupation; gross income, and other such data. This information may be organized and stored in one or more tables within database 206 (step 420). This information may be updated as additional tax returns are filed during the tax season. For example, database 206 may be updated daily, weekly, monthly, yearly, or any other amount of time.

As additional tax returns are filed, the data contained in the additional tax returns may be analyzed by risk monitoring center 104 (step 430) and the tax return may be assigned to one or more groups. In addition, database 206 may be updated with the new data. In addition to updating database 206, the grouped data may also be compared against previously stored data to detect potential fraud. Thousands of tax returns may be filed each day during the tax season. As the tax returns are filed, risk monitoring center 104 may receive the data and analyze the data to detect potential fraud by comparing the grouped data contained in the tax return with the grouped data contained in database 206.

For example, risk monitoring center 104 may receive one or more tax returns with an associated postal code (e.g. a zip code), and may compare the income information of these tax returns with other income information of filed tax returns with the same postal code. One of ordinary skill in the art would appreciate that risk monitoring center 104 may also compare the postal code to a group of more than one similar postal codes. In addition to grouping and comparing by postal code, risk monitoring center 104 may also group and compare by, for example, a street name, city, state, occupation, and/or gross income associated with the tax return.

After receiving the information regarding a current tax return, risk monitoring center 104 may query the information contained in database 206 (step 440). If risk monitoring center 104 compares the postal code, risk monitoring center 104 may determine, for example, an average gross income of each filed tax return for the associated postal code. As additional tax returns are filed, the information contained in the postal code table of database 206 may increase and more accurately reflect the average gross income of the tax returns for taxpayers in the associated postal code.

Based on the information contained in database 206, risk monitoring center 104 may determine if a group tax return exhibits a change in pattern which may indicate a potential fraud. For example, if the average gross income within a postal code is $50,000 and numerous tax returns are filed within gross incomes that are substantially less than $50,000 (e.g. $5,000), risk monitoring center 104 may determine that this group of tax returns is possibly fraudulent and may determine a risk score associated with this group.

After comparing the grouped tax return information with the information contained in database 206, risk monitoring engine 208 may generate one or more risk scores (step 450). A plurality of risk scores may exist, and different types of risk may have different risk scores depending on the identified risk. In addition, each risk score may be compared with a risk score threshold that may be predetermined or customized. For example, each tax season different risk score thresholds may be determined. Conversely, risk score thresholds may be used, unchanged, between tax seasons.

Depending on the risk score determined by risk monitoring engine 208, risk monitoring engine 208 may determine if the score exceeds the threshold score (step 460). If the score does exceed the threshold score, risk monitoring engine 208 may flag the group of tax returns and send one or more alerts to one or more administrators 108a-108n (step 470). Administrators 108a-108n may review the one or more alerts regarding the potential risk of fraud in the tax return, conduct a more detailed analysis of the identified risk, and determine if the individual is attempting to fraudulently file the tax return (step 480).

According to the above example, risk monitoring center 104 may provide an indication that the fraudulent filing of tax returns with similar gross incomes in one or more postal codes is prevalent. Therefore, by sending alerts to administrators 108a-108n regarding this type of fraudulent activity, both risk monitoring center 104 and administrators 108a-108n may become aware of this type of fraud, and the risk monitoring rules and monitoring algorithms may be updated to more closely monitor this type of risk. One of ordinary skill in the art would appreciate that numerous other types of fraudulent activity in addition to identity purchase and theft such as, for example, fraudulent deductions and fraudulent exemptions may also be monitored, scored, and further analyzed for fraud during the current tax season.

While certain features and embodiments of the disclosure have been described, other embodiments of the disclosure will be apparent to those skilled in the art from consideration of the specification and practice of the embodiments of the disclosure disclosed herein. Furthermore, although aspects of embodiments of the present disclosure have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the disclosure.

Moreover, one of ordinary skill would appreciate that the disclosure may be used in other fields in addition to tax returns, such as, for example, insurance claims, visas/immigration, etc.

It is intended, therefore, that the specification and examples be considered as exemplary only, with a true scope and spirit of the disclosure being indicated by the following claims and their full scope of equivalents.

What is claimed is:

1. A system, comprising:
one or more processors to:
receive first tax return data associated with a plurality of first tax return documents;
parse the first tax return data to identify a plurality of different types of data included in the first tax return data;
identify, based on the plurality of different types of data, a plurality of groups,
each group of the plurality of groups being associated with at least one type of data from the plurality of different types of data;
associate, for each group of the plurality of groups, at least a portion of the first tax return data with the group;
identify, for a first group of the plurality of groups, a first pattern,
the first pattern being based on the portion of the first tax return data associated with the first group;
receive second tax return data associated with a plurality of second tax return documents from a plurality of client devices;
assign the second tax return documents to the plurality of groups based on a plurality of different types of data included in the second tax return data;
identify, for the first group of the plurality of groups, a second pattern,
the second pattern being based on a portion of the second tax return data,
the portion of the second tax return data being associated with second tax return documents assigned to the first group;
compare the first pattern to the second pattern;
determine, based on comparing the first pattern to the second pattern, that a subset of the second tax return documents, assigned to the first group, exhibit a change in pattern; and
update a monitoring algorithm, based on the change in pattern; and
monitor, using the monitoring algorithm, third tax return documents for a particular type of risk associated with the change in pattern.

2. The system of claim 1, where the plurality of different types of data includes postal code information, and
where, when assigning the second tax return documents, the one or more processors are to:
assign the second tax return documents based on the postal code information.

3. The system of claim 1, where the first tax return data and the plurality of first tax return documents relate to a particular period of time, and
> where, when receiving the second tax return documents, the one or more processors are to:
>> receive the second tax return documents during the particular period of time.

4. The system of claim 1, where the one or more processors are further to:
> generate, based on comparing the first pattern to the second pattern, a risk score;
> determine whether the risk score satisfies a threshold; and
> transmit an alert based on the risk score satisfying the threshold.

5. The system of claim 1, where the plurality of different types of data includes at least one of:
> street name information,
> gross income information, or
> city information.

6. The system of claim 1, where information associated with the plurality of different types of data are stored in a database, and
> where the one or more processors are further to:
>> update the database based on receiving additional tax return documents.

7. The system of claim 1, where the one or more processors are further to:
> update, based on receiving the second tax return documents, a database, including information associated with the plurality of first tax return documents, with information associated with the second tax return documents.

8. A method, comprising:
> receiving, by one or more processors, first tax return data associated with a plurality of first tax return documents;
> parsing, by the one or more processors, the first tax return data to identify a plurality of different types of data included in the first tax return data;
> identifying, by the one or more processors and based on the plurality of different types of data, a plurality of groups,
>> each group of the plurality of groups being associated with at least one type of data from the plurality of different types of data;
> associating, by the one or more processors and for each group of the plurality of groups, at least a portion of the first tax return data with the group;
> identifying, by the one or more processors and for a first group of the plurality of groups, a first pattern,
>> the first pattern being based on the portion of the first tax return data associated with the first group;
> receiving, by the one or more processors, second tax return data associated with a plurality of second tax return documents from a plurality of client devices,
> assigning, by the one or more processors, the second tax return documents to the plurality of groups based on the plurality of different types of data included in the second tax return data;
> identifying, by the one or more processors and for the first group of the plurality of groups, a second pattern,
>> the second pattern being based on a portion of the second tax return data,
>>> the portion of the second tax return data being associated with second tax return documents assigned to the first group;
> comparing, by the one or more processors, the first pattern to the second pattern;
> determining, by the one or more processors and based on comparing the first pattern to the second pattern, that a subset of the second tax return documents exhibit a change in pattern,
>> the subset of the second tax return documents assigned to the first group being associated with a particular group of the plurality of groups; and
> updating, by the one or more processors, based on the change in pattern, a monitoring algorithm; and
> monitoring, by the one or more processors and using the monitoring algorithm, third tax return documents for a particular type of risk associated with the change in pattern.

9. The method of claim 8, where the second tax return data and the first tax return documents relate to a particular period of time.

10. The method of claim 9, where receiving the second tax return documents includes:
> receiving the second tax return documents during the particular period of time.

11. The method of claim 8, where the plurality of different types of data includes postal code information,
> where assigning the second tax return documents includes:
>> assigning the second tax return documents based on the postal code information.

12. The method of claim 8, where information associated with the plurality of different types of data are stored in a database, and
> where the method further comprises:
>> updating the database based on receiving additional tax return documents.

13. The method of claim 8, where the plurality of different types of data includes at least one of:
> street name information,
> gross income information, or
> city information.

14. The method of claim 8, further comprising:
> generating, based on comparing the first pattern to the second pattern, a risk score;
> determining whether the risk score satisfies a threshold; and
> transmitting an alert based on the risk score satisfying the threshold.

15. A computer-readable medium storing instructions, the instructions comprising:
> one or more instructions that, when executed by one or more processors, cause the one or more processors to:
>> receive first tax return data associated with a plurality of first tax return documents;
>> parse the first tax return data to identify a plurality of different types of data included in the first tax return data;
>> identify, based on the plurality of different types of data, a plurality of groups,
>>> each group of the plurality of groups being associated with at least one type of data from the plurality of different types of data;
>> associate, for each group of the plurality of groups, at least a portion of the first tax return data with the group;
>> identify, for a first group of the plurality of groups, a first pattern,
>>> the first pattern being based on the portion of the first tax return data associated with the first group;

receive second tax return data associated with a plurality of second tax return documents from a plurality of client devices, assign the second tax return documents to the plurality of groups based on the plurality of different types of data included in the second tax return data;

identify, for the first group of the plurality of groups, a second pattern, the second pattern being based on a portion of the second tax return data, the portion of the second tax return data being associated with second tax return documents assigned to the first group;

compare the first pattern to the second pattern;

determine, based on comparing the first pattern to the second pattern, that the second tax return documents exhibit a change in pattern; and update a monitoring algorithm, based on the change in pattern; and monitor, using the monitoring algorithm, third tax return documents for a particular type of risk associated with the change in pattern.

16. The computer-readable medium of claim 15, where the plurality of different types of data includes at least one of:

postal code information,
street name information,
gross income information, or
city information.

17. The computer-readable medium of claim 15, where the second tax return data and the first tax return documents relate to a particular period of time, and where the one or more instructions, that cause the one or more processors to receive the second tax return documents, cause the one or more processors to:

receive the second tax return documents during the particular period of time.

18. The computer-readable medium of claim 15, where the one or more instructions, when executed by the one or more processors, further cause the one or more processors to:

update, based on receiving the second tax return documents, a database, including information associated with the plurality of first tax return documents, with information associated with the second tax return documents.

19. The computer-readable medium of claim 15, where the one or more instructions, when executed by the one or more processors, further cause the one or more processors to:

generate, based on comparing the first pattern and the second pattern, a risk score;
determine whether the risk score satisfies a threshold; and
transmit an alert based on the risk score satisfying the threshold.

20. The computer-readable medium of claim 15, where information associated with the plurality of different types of data are stored in a database, and where the one or more instructions, when executed by the one or more processors, further cause the one or more processors to:

update the database based on receiving additional documents.

* * * * *